US011403362B1

(12) United States Patent
Liu et al.

(10) Patent No.: US 11,403,362 B1
(45) Date of Patent: Aug. 2, 2022

(54) INTERACTION ON A WEB PAGE (71) Applicant: INTERNATIONAL BUSINESS MACHINES CORPORATION, Armonk, NY (US)

(72) Inventors: Yi Liu, Beijing (CN); Yin Xia, Beijing (CN); Xiang Juan Meng, Beijing (CN); Li Wei Wang, Beijing (CN); Wei Xu, Beijing (CN); Jian Jiao Wen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/147,029

(22) Filed: Jan. 12, 2021

(51) Int. Cl.
*G06F 16/957* (2019.01)
*G06F 9/451* (2018.01)
*G06F 3/023* (2006.01)
*G06F 8/38* (2018.01)
*G06F 16/954* (2019.01)
*G06F 16/958* (2019.01)

(52) U.S. Cl.
CPC ............ *G06F 16/957* (2019.01); *G06F 3/023* (2013.01); *G06F 8/38* (2013.01); *G06F 9/451* (2018.02); *G06F 16/954* (2019.01); *G06F 16/986* (2019.01)

(58) Field of Classification Search
None
See application file for complete search history.

(56) References Cited

U.S. PATENT DOCUMENTS

| 7,111,243 | B1* | 9/2006 | Ballard et al. ............ G06F 3/00 |
| 7,216,298 | B1 | 5/2007 | Ballard |
| 7,263,662 | B1 | 8/2007 | Ballard |
| 7,263,663 | B2 | 8/2007 | Ballard |
| 7,673,241 | B2* | 3/2010 | Sun et al. ................. G06F 3/00 |
| 8,977,966 | B1* | 3/2015 | Saurav ..................... G06F 3/00 |
| 9,489,131 | B2 | 11/2016 | Seymour |
| 2003/0208472 | A1* | 11/2003 | Pham ...................... G06F 15/16 |

(Continued)

FOREIGN PATENT DOCUMENTS

| EP | 2237243 A1 | 10/2010 |
| IN | 201823015747 A | 10/2018 |

(Continued)

OTHER PUBLICATIONS

Anderson, "How To Design Websites For Blind/Visually Impaired, Deaf, Disabled & Dyslexic Visitors", Feedburner, Feb. 4, 2020, 37 pages, <https://www.hobo-web.co.uk/design-website-for-blind/>.

(Continued)

*Primary Examiner* — James J Debrow
(74) *Attorney, Agent, or Firm* — David Spalding (57) ABSTRACT

Embodiments of the disclosure provide methods, systems, computer program products for accessing web pages interactively are disclosed. According to the method, a web page comprising a plurality of user interface elements is accessed. Then information comprising identifications of the plurality of user interface elements and hot keys corresponding to the plurality of user interface elements is obtained. And then the information is sent to an assistive tool for being read out. In response to a hot key corresponding to a user interface element being input, an action corresponding to the user interface element is executed.

20 Claims, 8 Drawing Sheets

(56) References Cited

U.S. PATENT DOCUMENTS

| | | | |
|---|---|---|---|
| 2005/0038657 A1* | 2/2005 | Roth et al. | G10L 13/08 |
| 2009/0070205 A1* | 3/2009 | Altberg et al. | G06Q 30/00 |
| 2014/0089772 A1 | 3/2014 | Shetty | |
| 2014/0344665 A1 | 11/2014 | Lorenzo | |
| 2015/0199309 A1* | 7/2015 | Harrison | G06F 3/048 |

FOREIGN PATENT DOCUMENTS

| | | |
|---|---|---|
| JP | 2012212339 A | 11/2012 |
| KR | 100747724 B1 | 8/2007 |

OTHER PUBLICATIONS

Blazheska-Tabakovska, "Web Content Accessibility for People with Cognitive Disabilities", ResearchGate, International Conference on Applied Internet and Information Technologies, Oct. 3-4, 2019, Zrenjanin, Republic of Serbia, 5 pages, Accessed Jan. 12, 2021, <https://arxiv.org/abs/2005.09639>.

Cai, et al., "Extracting Content Structure for Web Pages based on Visual Representation," ResearchGate, Conference Paper in Lecture Notes in Computer Science, Apr. 2003, 13 pages, <https://www.researchgate.net/publication/221239815>.

Disclosed Anonymously, "System and Method of Enabling Web Accessibility," IP.com Prior Art Database Technical Disclosure, IP.com No. IPCOM000198306D, Aug. 4, 2010, 8 pages.

Fauzi, et al., "Webpage Segmentation for Extracting Images and Their Surrounding Contextual Information", ACM Multimedia, arXiv:2005.09639[cs.MM], May 18, 2020, 4 pages, <DOI: 10.1145/1631272.1631379>.

Lele, et al., "Human Computer Interaction for Visually Impaired Users in Web Based Applications", International Journal of Scientific & Engineering Research, vol. 4, Issue 8, Aug. 2013, 1213, ISSN 2229-5518, Jun. 13, 2019, 4 pages.

Mell et al., "The NIST Definition of Cloud Computing", National Institute of Standards and Technology, Special Publication 800-145, Sep. 2011, pp. 1-7.

Oyewole, "How Visually Impaired People Navigate the Web", UX Collective, Jun. 19, 2019, pp. 1-6.

Siam, "Method and System for Improving Web Accessibility for People with Disabilities", IP.com Prior Art Database Technical Disclosure, IP.com No. IPCOM000259540, Aug. 21, 2019, 6 pages.

Zhang, et al., "Personalized Assistive Web for Improving Mobile Web Browsing and Accessibility for Visually Impaired Users", ACM Transactions on Accessible Computing, vol. 10, No. 2, Article 6, Publication date: Apr. 2017, pp. 6:1-6:22, <https://dl.acm.org/doi/10.1145/3053733>.

* cited by examiner

INTERACTION ON A WEB PAGE

BACKGROUND

The present disclosure relates to web services, and more specifically, to methods, systems and computer program products for accessing web pages interactively.

With the high-speed development of computer and internet technologies, accessing web pages on the internet become an essential part of daily life in modern times. Sighted people, visually impaired and blind people would navigate the contents of a website by interacting with web pages on the website to get information from the website or get service provided by the website. And web page accessibility is mandatory for web service providers in accordance with law of some countries or regions.

SUMMARY

According to one embodiment of the present disclosure, there is provided a method for accessing web pages interactively. According to the method, a web page comprising a plurality of user interface elements is accessed. Then information comprising identifications of the plurality of user interface elements and hot keys corresponding to the plurality of user interface elements is obtained. And then the information is sent to an assistive tool for being read out. In response to a hot key corresponding to a user interface element being input, an action corresponding to the user interface element is executed.

According to another embodiment of the present disclosure, there is provided a system for accessing web pages interactively. The system comprises one or more processors, a memory coupled to at least one of the processors; and a set of computer program instructions stored in the memory and executed by at least one of the processors in order to perform actions of the above method.

According to yet another embodiment of the present disclosure, there is provided a computer program product for accessing web pages interactively. The computer program product comprises a computer readable storage medium having program instructions stored thereon, the program instructions executable by one or more processors in a load balancer cluster which comprises a plurality of load balancers and an assistant, to cause the one or more processors to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
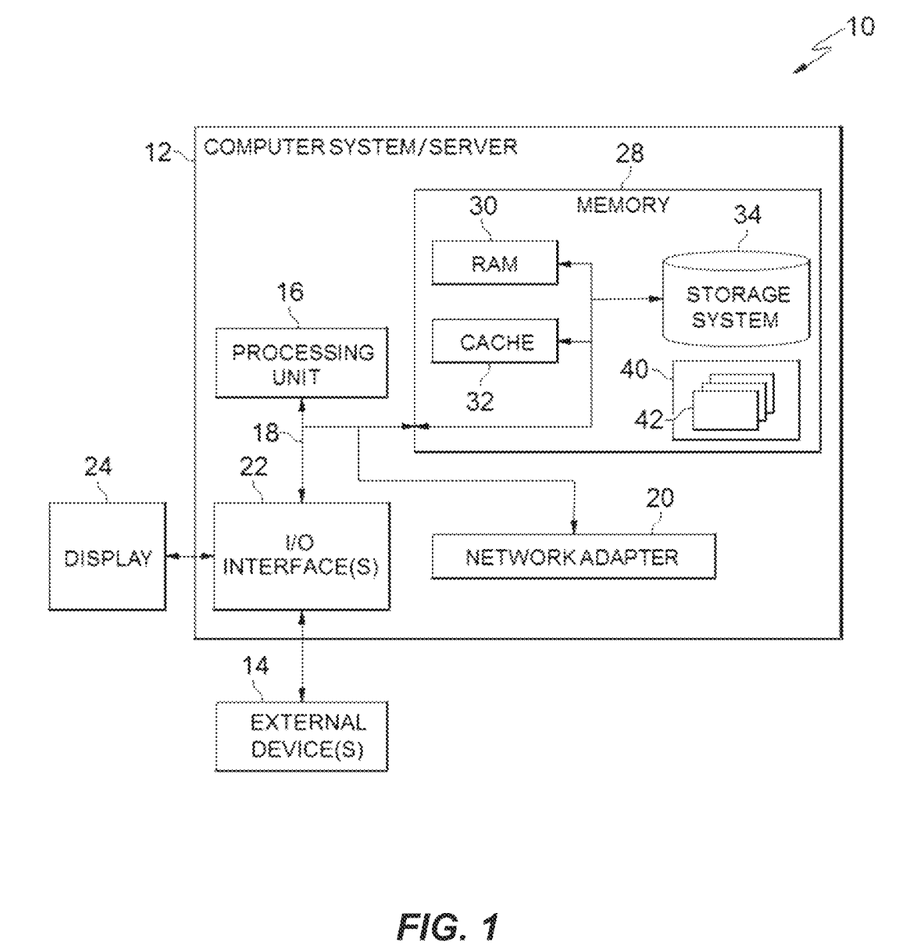
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
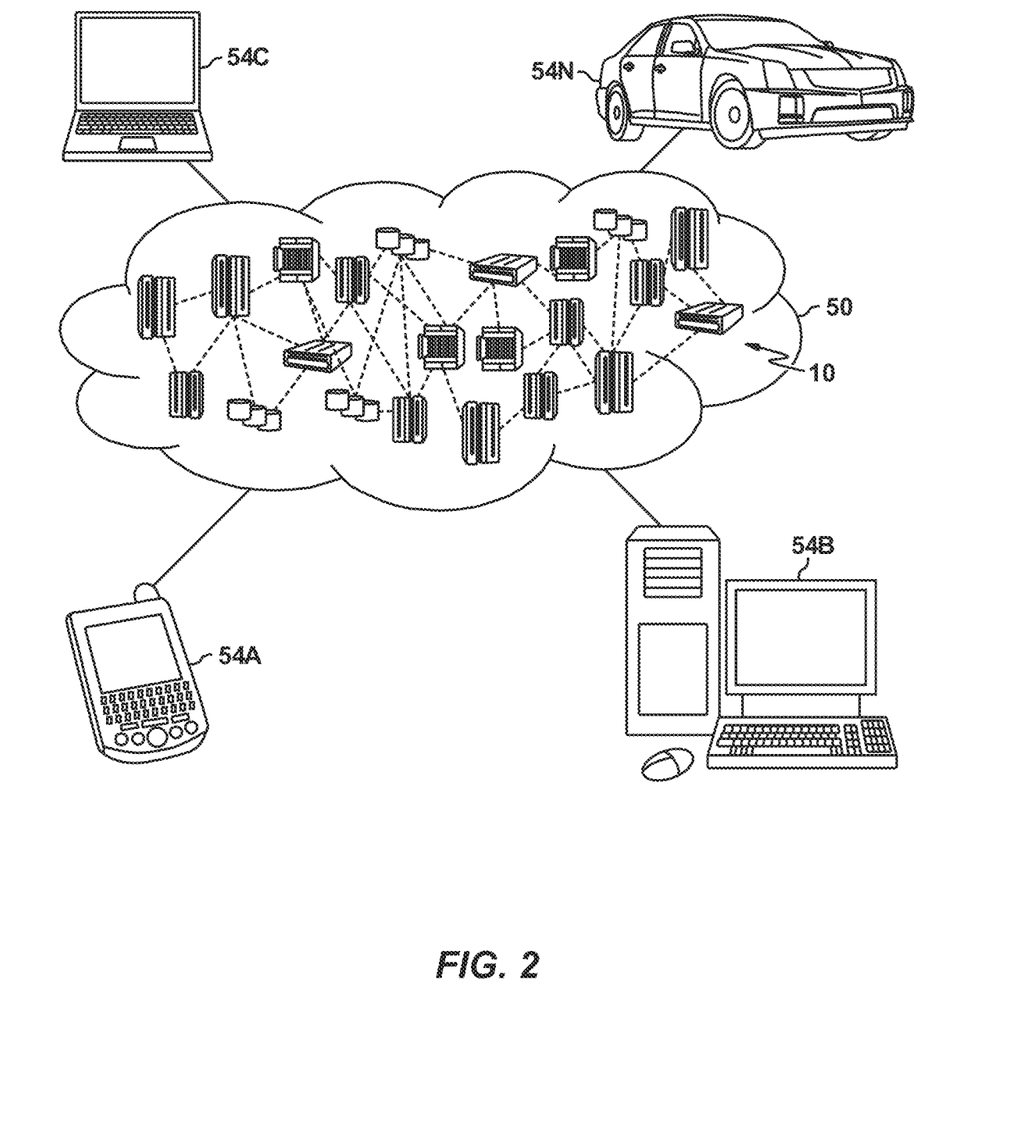
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
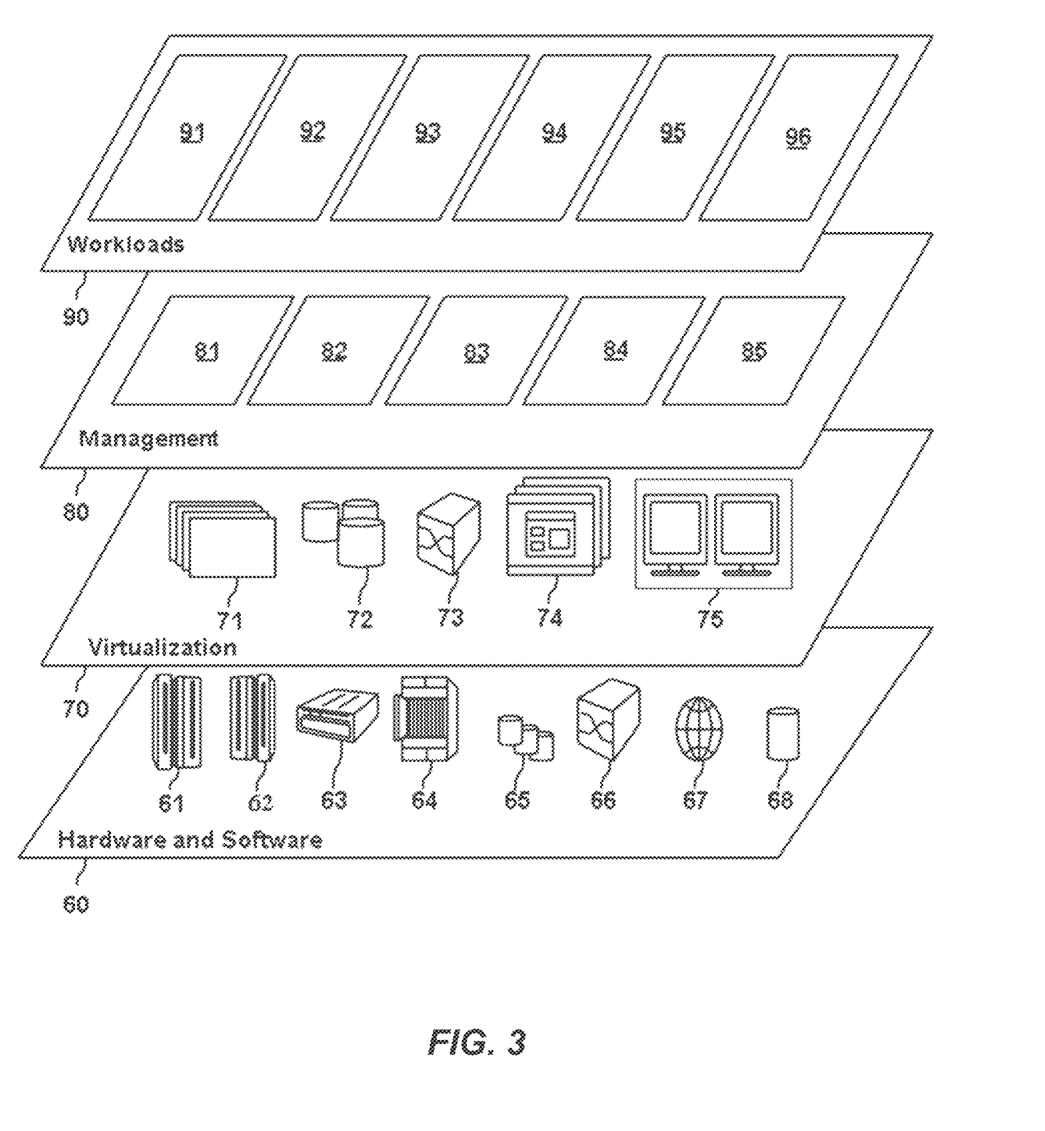
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and web page accessing 96.

Currently, the sighted people can navigate the contents of a web page with mices and trackpads. In order to provide proper information access for the visually impaired or blind people and to bridge the communication gap between the sighted people and the visually impaired or blind people, the visually impaired or blind people now can navigate contents of a web page by relying on assistive technologies involving text to speech tools (for example, an application referred as "screen reader") and keyboards. More specifically, a text-to-speech tool can read out messages of the major components of a web page for a visually impaired or blind user, then the visually impaired or blind user can hit a predefined key, such as "tab" key on the keyboard, multiple times before reaching the information to be accessed.

Figure 4:
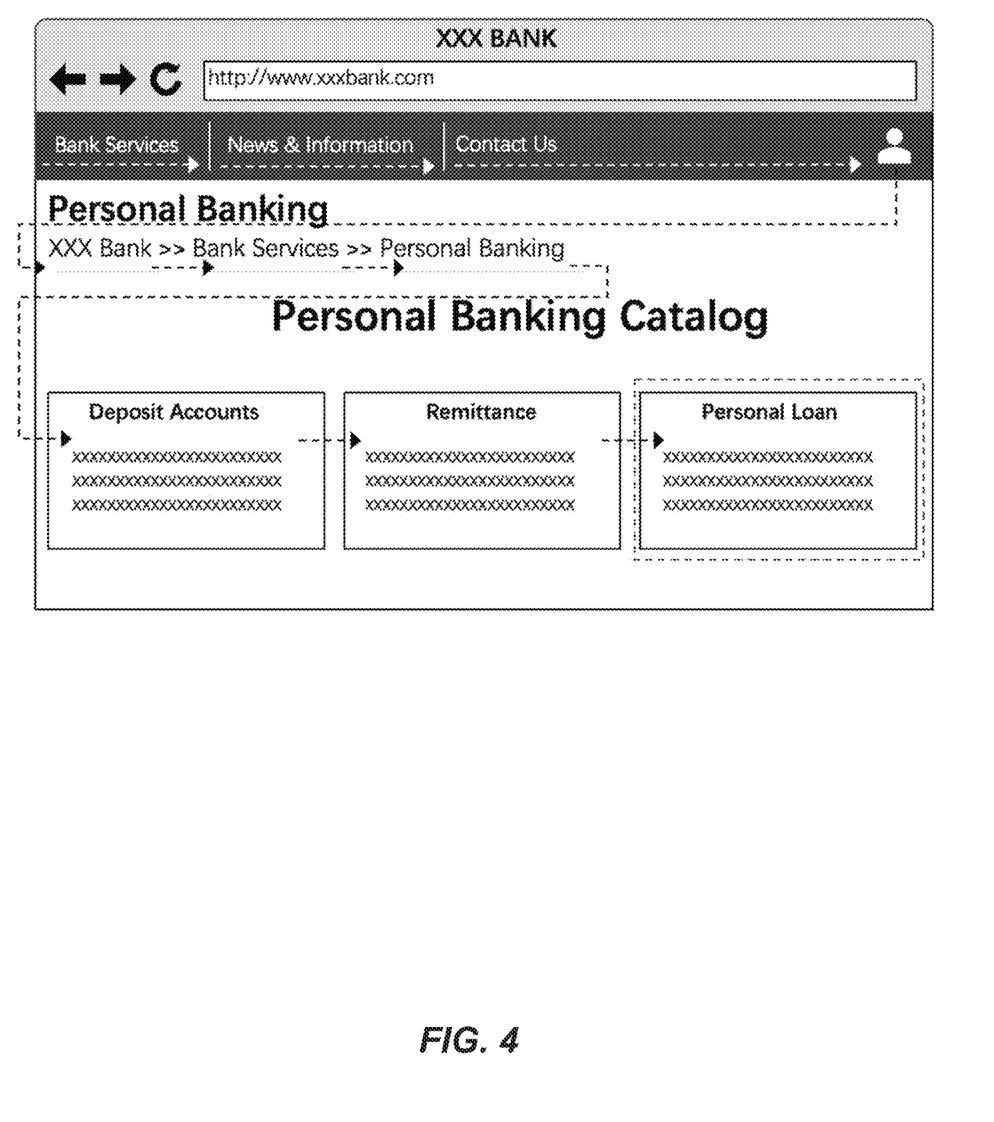
FIG. 4 depicts an exemplary web page accessed by a visually impaired or blind user.

FIG. 4 depicts an exemplary web page accessed by a visually impaired or blind user. There are ten user interface elements on the web page which can be accessed by the visually impaired or blind user, referred to as "Bank Services", "News & Information", "Contact Us", "User(portrait)", "XXXbank", "Bank Services", "Personal Baking", "Deposit Accounts", "Remittance", "Personal Loan" respectively. An assistive tool, such as the application "screen reader", can read messages of the user interface elements on the web page for the visually impaired or blind user. When the visually impaired or blind user would like to move the focus to the user interface element named "Personal Loan" panel in the "Personal Banking Catalog" section using the existing solution, the user may first hear "Bank service" from the application "screen reader", then press "Tab" key and hear "News & Information" from the application "screen reader", afterward press "Tab" key again and hear "Contact Us" from the application "screen reader" again and so on. In this way, the user has to press "Tab" key for nine times to move the focus to the user interface element "Personal Loan" in a specified direction (indicated by arrows shown in FIG. 4) after hearing respective messages of user interface elements. This makes it very inconvenient for the visually impaired or blind user to access the web page. This situation creates barriers for these visually impaired or blind people to efficiently interact with web pages.

In view of above, there is a strong and practical need to provide a new method to implement an efficient interaction on web page accessibility for the visually impaired or blind people. Therefore, a new accessing method to a web page is provided for the visually impaired or blind people in this disclosure, in which each user interface element on the web page is assigned with a hot key, which is a series of one or several keys that invoke a software program to perform a preprogrammed action corresponding to a user interface element. All these user interface elements and their corresponding hot keys are sent to an assistive tool so that the assistive tool can read them out for a visually impaired or blind user. The visually impaired or blind user can use a hot key to quick access a user interface element corresponding to the hot key. Although the method is designed for visually impaired or blind users, sighted users can use the method if needed.

Figure 5:
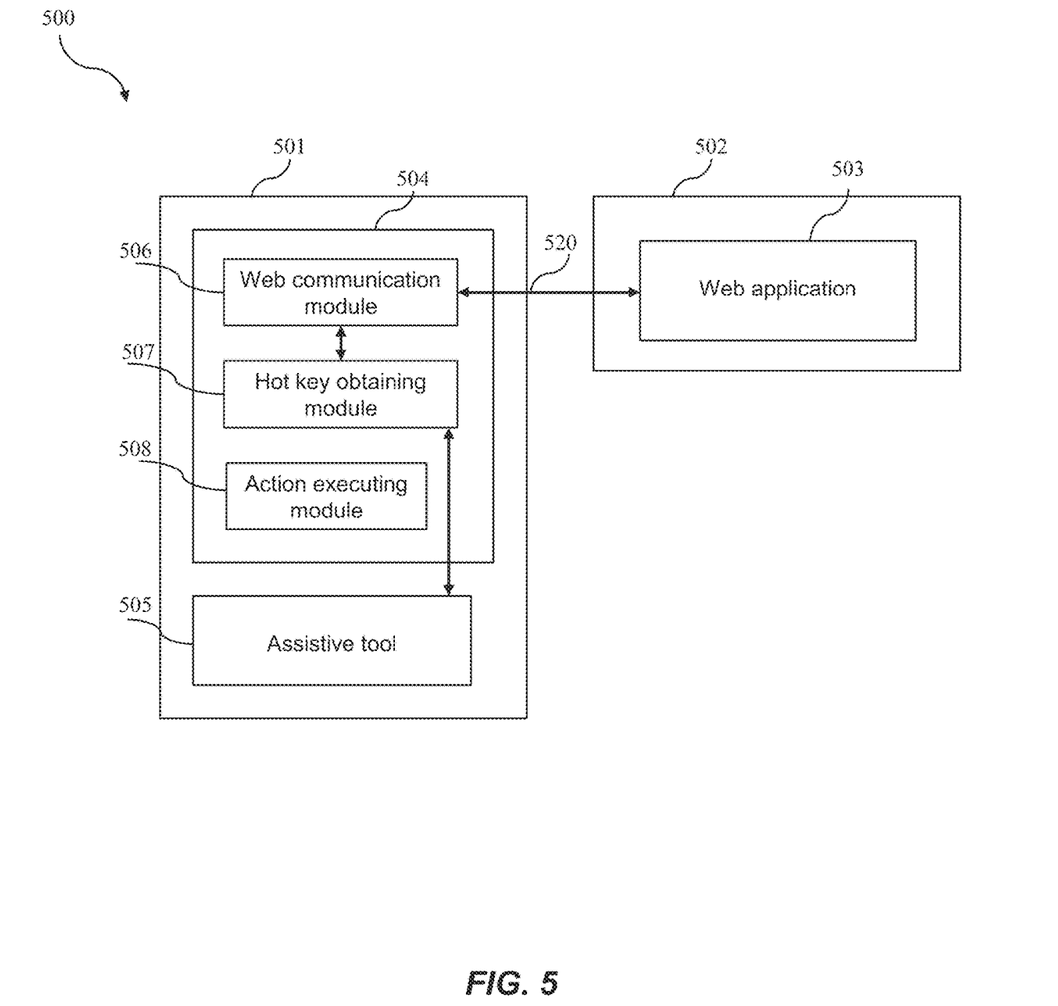
FIG. 5 depicts an exemplary usage environment according to some embodiments of the present disclosure.

Referring to FIG. 5, an exemplary usage environment 500 of the present disclosure is depicted according to some embodiments of this disclosure. The usage environment 500 includes a web client 501 and a web application server 502. The web client 501 and the web application server 502 are connected directly or indirectly via a communication network 520. A web application 503 runs on the web application server 502. A visually impaired or blind user may access the web application 503 via a browser 504 installed on the web client 501 with the help of an assistive tool 505 on the web client 501. The browser 504 may include a web communication module 506, a hot key obtaining module 507 and an action executing module 508.

The communication network 520 may include various types of communication networks, such as a wide area network (WAN), local area network (LAN), a telecommunication network, a wireless network, a public switched network and/or a satellite network. The communication network may include connections, such as wire, wireless communication links, or fiber optic cables. It may be appreciated that FIG. 5 provides only an illustration of one implementation and does not imply any limitations with regard to the environments in which different embodiments may be implemented. Many modifications to the depicted environments may be made based on design and implementation requirements.

The web client 501 may be, for example, a mobile device, a telephone, a personal digital assistant, a netbook, a laptop computer, a tablet computer, a desktop computer, or any type of computing device capable of running a program and accessing a network. The web client 501 and the web application server 502 may operate in a cloud computing service model, such as Software as a Service (SaaS), Platform as a Service (PaaS), or Infrastructure as a Service (IaaS). The web client 501 and the web application server 502 may also be located in a cloud computing deployment model, such as a private cloud, community cloud, public cloud, or hybrid cloud.

The browser 504 on the web client 501 may access a web page provided by the web application 503 on the web application server 502 via the web communication module 506. The web page comprises web page contents expressed as Hypertext Markup Language (HTML), Extensible Markup Language (XML) documents, and the like. When the web page is accessed by the web communication module 506, a plurality of user interface elements comprised in the web page contents are displayed on the screen of the web client 501. When a user interface element is activated by a user, such as the user moves the focus of a mouse to the displayed user interface element and presses the mouse button, an action corresponding to the user interface element can be executed by the browser 504.

However, a visually impaired or blind user cannot operate the mouse to move the focus of the mouse to the displayed user interface element. According to embodiments of this disclosure, the hot key obtaining module 507 in the browser 504 can obtain information comprising respective identifications (IDs) of the plurality of user interface elements on the web page and their corresponding hot keys and send the information to the assistive tool 505 on the client 501 so that the assistive tool 505 can read out the information to the visually impaired or blind user. An identification (ID) of a user interface element may be ID number of the user interface element, a name of the user interface element, and the like. Then the visually impaired or blind user can input a hot key corresponding to a user interface element to activate the user interface element, so that the action executing module 508 can execute an action corresponding to the user interface element.

In some embodiments, the information comprising respective IDs of the plurality of user interface elements on the web page and respective hot keys corresponding to respective user interface elements can be expressed as any data structure, such as a table, an XML file, a text file, and the like. For example, Table 1 shows exemplary table of such information on the web page shown in FIG. 4.

TABLE 1

| No. | ID of user interface element | Hot key |
| --- | --- | --- |
| 1 | Bank Services | Alt a |
| 2 | News & Information | Alt b |
| 3 | Contact Us | Alt c |
| 4 | User | Alt d |
| 5 | XXXthank | Alt e |
| 6 | Bank Services | Alt f |
| 7 | Personal Banking | Alt g |
| 8 | Deposit Accounts | Alt h |
| 9 | Remittance | Alt i |
| 10 | Personal Loan | Alt j |

The assistive tool 505 is a text-to-speech tool for visually impaired or blind users, such as the application named "Screen reader". The tool 505 can read text for the visually impaired or blind users so that the visually impaired or blind users can understand the contents on the web page and/or know what action they should take. When the assistive tool 505 receives the information comprising respective IDs of the plurality of user interface elements and respective hot keys corresponding to respective user interface elements from the hot key obtaining module 507, the assistive tool 505 can read out the information such that the visually impaired or blind user can know which key(s) should be pressed if he/she wants to interact with a user interface element. For example, if a text-to-speech receive the above Table 1, the tool 505 may read "Bank Services, press Alt a; News & Information, press Alt b; Contact Us, press Alt c, User, press Alt d . . . ". The hot key in this disclosure may be a single key or a key composition. And the hot key may be a key or a key composition on a keyboard of the web client 501, or an external keyboard device special for the visually impaired or blind users which connects to the web client 501 by wired or wireless communication channel and actions of the external keyboard device can be received and parsed by the browser 504.

Once the impaired user, after hearing the above information, inputs a hot key corresponding to a user interface element, the action executing module 508 may execute an action corresponding to the user interface element. In some embodiments, a mouse action to be executed when the user interface element corresponding to the hot key is activated can be obtained by the action executing module 508 and then the mouse action can be executed by the action executing module 508. The mouse action is originally designed to be taken by a sighted user. State differently, the action executing module 508 simulates the hot key pressing action into an existing sighted user's action to quick access a specific user interface element corresponding to the hot key. In some embodiments, a multiple tab hits action to be executed when the user interface element corresponding to the hot key is activated can be obtained by the action executing module 508 and then the mouse action can be executed by the action executing module 508. The multiple tab hits action is originally designed to be taken by a visually impaired or blind user in the existing technologies. For example, when the visually impaired or blind user wants to activate the component of "Personal Loan", the visually impaired or blind user may press "tab" key on the keyboard 9 times, which is the multiple tab hits action. In other words, the action executing module 508 simulates the hot key press action into an existing, complicated visually impaired or blind user's action, e.g. the multiple tab hits action, to quick access a specific user interface element corresponding to the hot key.

In some embodiments, the web application 503 is not aware that the user operating the web browser 504 is a visually impaired or blind user, while the browser 504 is aware that. For example, the web browser 504 has been configured that it is operated by a visually impaired or blind user. Therefore, the web page provided for a visually impaired or blind user is the same as the web page provided for a sighted user in the web application 503. The hot key obtaining module 507 may obtain respective IDs of the plurality of user interface elements from web contents of the web page by parsing the web contents of the web page using existing technologies such as Document Object Model (DOM) and then assign respective hot keys to respective user interface elements. DOM is an application program interface for valid HTML and XML documents. It defines the logical structure for documents and specifies the way that documents are accessed and manipulated. With the DOM, programmers can build documents, navigate document structure, and add, modify and delete elements and contents.

For example, the ten user interface elements, named "Bank Services", "News & Information", "Contact Us", "User(portrait)", "XXXbank", "Bank Services", "Personal Banking", "Deposit Accounts", "Remittance", "Personal Loan" can be obtained respectively by parsing the web contents on the web page shown in FIG. 4 using DOM, then a hot key such as "Alt a" can be assigned to the user interface element "Bank Services", and a hot key "Alt b" can be assigned to the user interface element "News & Information", and so on. Afterwards, the information comprising respective IDs of respective user interface elements and respective hot keys corresponding to respective user interface elements, such as the information comprised in Table 1, can be generated and sent to the assistive tool 505. Those skilled in the art may understand that the above hot keys are for illustrative purposes, any other keys can be assigned as the hot keys.

In some embodiments, the web application 503 is aware that the user operating the web browser 504 is a visually impaired or blind user, so is the browser 504. For example, the user is registered to the web application 503 as a visually impaired or blind user and the web browser 504 has been configured that it is operated by a visually impaired or blind user. Then, the web page provided for a visually impaired or blind user is different from the web page provided for a sighted user in the web application 503. The web contents on the web page provided for a visually impaired or blind user also comprises respective hot keys corresponding to respective user interface elements besides the respective user interface elements. The hot key obtaining module 507 may obtain the information comprising respective IDs of the plurality of user interface elements and respective hot keys corresponding to respective user interface elements directly by parsing the web contents of the web page using existing technologies.

In some embodiments, the web browser 504 also comprises user action monitoring module (which is not shown in FIG. 5) to monitor the visually impaired or blind user's action and report the monitored actions to the web application 503. This module is specifically designed for a register user or a specific web client device or a specific IP address of a web client. If the web client 501 is unique for the web application 503, the actions executed by the web client 501 on the web page are monitored. In some embodiments, the web application 503 is not aware that the user operating the web browser 504 is a visually impaired or blind user, while the browser 504 is aware that. If the web client 501 is monitored by user action monitoring module to access the user interface element "Personal Loan" frequently, such as much more time than other user interface elements, the hot key obtaining module 507 may reorganize the information in Table 1 into the information in following Table 2, in which ID of the specific user interface element and the hot key corresponding to the specific user interface element are at the beginning of the information so that the assistive tool 505 may read the hot key corresponding to the user interface element "Personal Load" first for the visually impaired or blind user.

TABLE 2

| No. | ID of user interface element | Hot key |
| --- | --- | --- |
| 1 | Personal Loan | Alt j |
| 2 | Bank Services | Alt a |
| 3 | News & Information | Alt b |
| 4 | Contact Us | Alt c |
| 5 | User | Alt d |
| 6 | XXXbank | Alt e |
| 7 | Bank Services | Alt f |
| 8 | Personal Baking | Alt g |
| 9 | Deposit Accounts | Alt h |
| 10 | Remittance | Alt i |

In some embodiments, the web application 503 is aware that the user operating the web browser 504 is a visually impaired or blind user, so is the browser 504. If the web application 503 receives from the user action monitoring module that the web client 501 is monitored to access the user interface element "Personal Loan" frequently, such as access much more time than other use interface elements, then the web contents on the web page provided by the web application 503 for a visually impaired or blind user comprises the above reorganized information shown in Table 2, thus the user interface element "Personal Loan" and the corresponding hot key thereof will be first read by the assistive tool 505 so that the visually impaired or blind user can input the hot key once hearing that.

Using the hot keys, the visually impaired or blind user can quick access a user interface element shown on the web page. However, the visually impaired or blind users may not understand what a user interface element means by only providing the messages (such as ID) of the user interface elements. In some embodiments, in the web application 503, respective descriptions for respective user interface elements may be caught by analyzing such as source code of web application 503, specification, help documents of web application 503 and the like, or the user's comments on the social network, etc. using text analyzing technologies, and then the respective descriptions for respective user interface elements may be input into the web contents of the web page. On the other hand, the hot key obtaining module 507 may further obtain the respective descriptions for the respective user interface elements and add the respective descriptions to the above information so that the respective descriptions can be sent to the assistive tool 505 for being read out. In this way, the visually impaired or blind users can understand the exact meaning of each user interface element. For example, the Table 1 may be revised as Table 3 after the respective descriptions for respective user interface elements are added.

TABLE 3

| No. | ID of user interface element | Hot key | Description |
| --- | --- | --- | --- |
| 1 | Bank Services | Alt a | Provide function . . . |
| 2 | News & Information | Alt b | Provide news and information . . . |
| 3 | Contact Us | Alt c | Provide Email address . . . |
| 4 | User | Alt d | Provide user information . . . |
| 5 | XXXthank | Alt e | Provide function . . . |
| 6 | Bank Services | Alt f | Provide functions including . . . |
| 7 | Personal Baking | Alt g | Provide functions of . . . |
| 8 | Deposit Accounts | Alt h | Provide functions of . . . |
| 9 | Remittance | Alt i | Provide functions of . . . |
| 10 | Personal Loan | Alt j | Provide functions of . . . |

Figure 6:
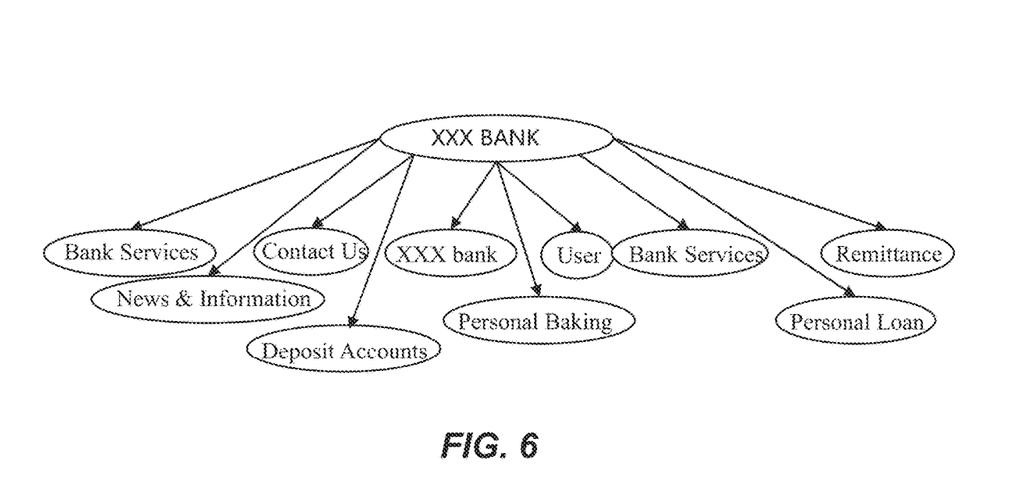
FIG. 6 depicts a tree structure for the web page shown in FIG. 4 according to some embodiments of the present disclosure.

Once the visually impaired or blind user enters a specific user interface element by press a hot key, it is easy for the visually impaired or blind user to lost among the complicated web page structure since the visually impaired or blind user cannot see the whole picture of the web page. A graphical representation of the user interface elements structure on the web page is called a tree structure which shows the connections between the various user interface elements. User interface elements have a logical structure like a tree. Each tree structure comprises a root node and zero or more child nodes. The root node represents the web page and each child node represents a user interface element that functions on the web page. In some embodiments, the web browser 504 also comprises a web content analyzing module (not shown in FIG. 5) to obtain the tree structure of user interface elements for the web page, wherein a root node of the tree structure represents the web page and each child node of the tree structure represents a user interface element that functions on the web page. FIG. 6 depicts a tree structure for the web page shown in FIG. 4 according to some embodiments of this disclosure. As shown in FIG. 6, the root node "XXX bank" represents the web page shown in FIG. 4, while the ten child nodes represent the ten user interface elements that function on the web page shown in FIG. 4. The web content analyzing module can send the tree structure to the assistive tool 505 so that the assistive tool 505 can read out the tree structure. In this way, the visually impaired or blind user may be aware his/her location on the web application 503.

In some embodiments, the web content analyzing module can parse web contents of the web page to obtain the tree structure of the web page using existing technologies such as DOM. In some embodiments, the web application 503 may generate the tree structure in the web contents and send the web contents to the browser 504 so that the web content analyzing module on the browser 504 can get the tree structure directly from the web page contents.

Figure 7:
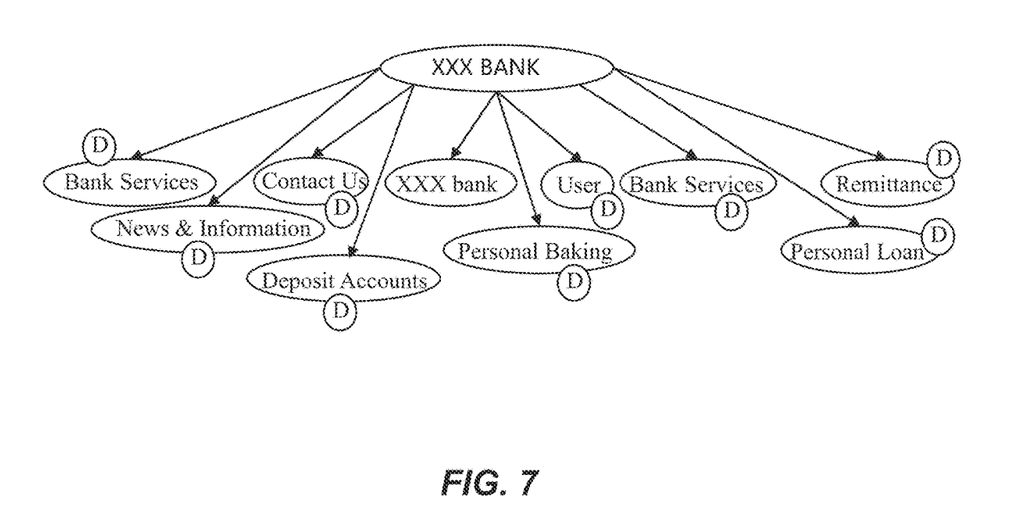
FIG. 7 depicts a tree structure together with respective descriptions for respective child nodes for the web page shown in FIG. 4 according to some embodiments of the present disclosure.

In some embodiments, similar to the description of the user interface element above, respective descriptions for respective child nodes of the tree structure may be caught on the web application 503, and then the respective descriptions for respective child nodes of the tree structure may be input into the web contents of the web page together with the tree structure. On the other hand, the web content analyzing module (not shown in FIG. 5) may obtain the tree structure and the respective descriptions for the respective child nodes of the tree structure and send them to the assistive tool 505 so that the assistive tool 505 can read out the tree structure and respective descriptions for respective child nodes. For example, FIG. 7 depicts a tree structure together with respective descriptions for respective child nodes for the web page shown in FIG. 4 according to some embodiments of this disclosure, in which the letter D in a circle represents the description of the child node next to the circle. In this way, the visually impaired or blind users can understand the whole picture of the web page and exact meaning of each child nodes.

Figure 8A:
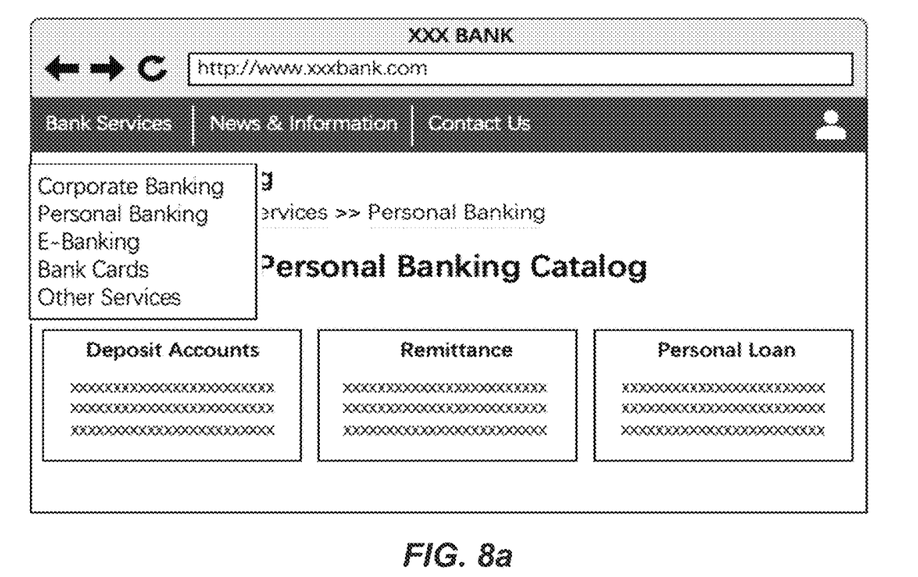
FIG. 8a depicts a web page displayed if the hot key "Alt a" corresponding to a user interface element "Bank Services" on the web page shown in FIG. 4 is input according to some embodiments of the present disclosure.
Figure 8B:
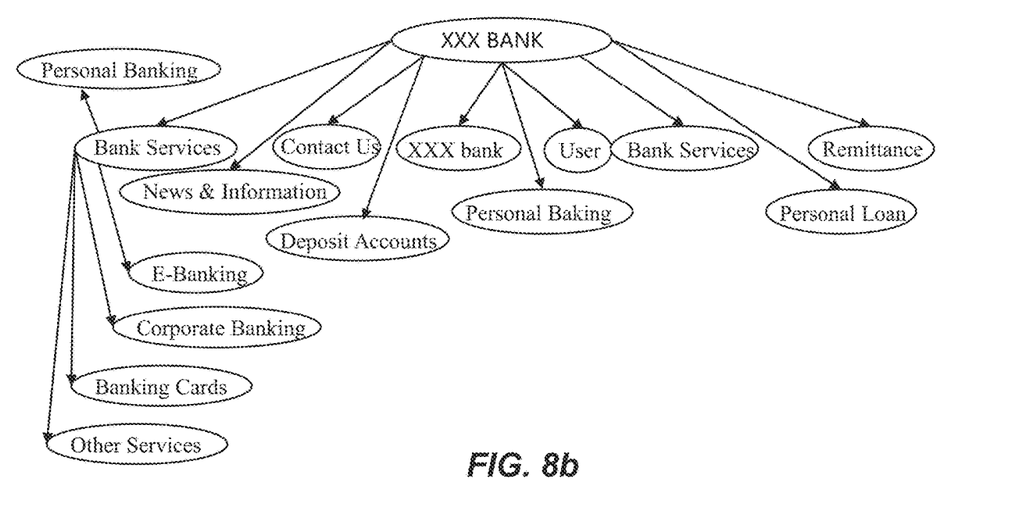
FIG. 8b depicts a tree structure obtained for the web page shown in FIG. 8a according to some embodiments of the present disclosure.

In some embodiments, if a plurality of related web pages is accessed by the visually impaired or blind user, the tree structure of user interface elements for the plurality of related web pages can be provided by the web application 503. Then the web content analyzing module (not shown in FIG. 5) in the browser 504 may obtain the tree structure of user interface elements for the plurality of related web pages and send the tree structure to the assistive tool 505 so that the assistive tool 505 can read out the tree structure. In some embodiments, each child node of the tree structure of the plurality of related web pages may comprise respective descriptions for respective child nodes. For example, if the visually impaired or blind user input the hot key "Alt a" corresponding to the user interface element "Bank Services" on the web page shown in FIG. 4, a web page is displayed on the screen of the client 501, as shown in FIG. 8a. A tree structure shown in FIG. 8b can be obtained by the web content analyzing module in the browser 504 and be sent to the assistive tool 505 so that the assistive tool 505 can read out the tree structure shown in FIG. 8b.

In some embodiments, the assistive tool 505 may be adaptively amended so that it can read out the above information or the tree structure instead of just read the messages of the user interface elements on the screen of the web client. The amendment to the assistive tool 505 is beyond the scope of this disclosure, so it will be omitted in this description. Alternatively, the browser may comprise a component to generate descriptions of above information or the tree structure for the assistive tool 505 so that the assistive tool 505 can read the descriptions directly.

Figure 9:
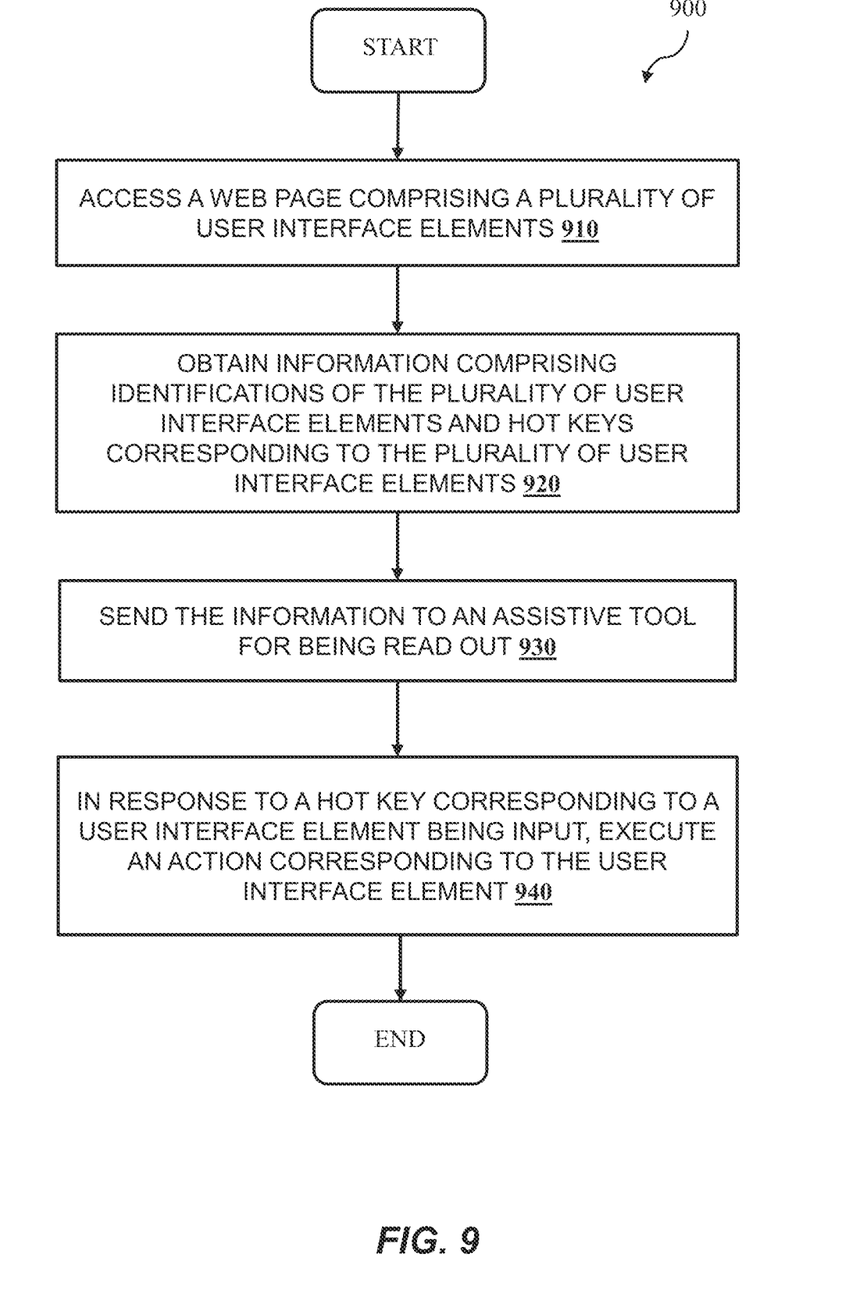
FIG. 9 depicts an operational flowchart for accessing web pages interactively according to some embodiments of the present disclosure.

Referring to FIG. 9, an operational flowchart 900 for accessing web pages interactively is depicted according to some embodiments of the present disclosure. The method can be implemented by a web browser by interacting with both an assistive tool such as a text-to-speech tool and a web application. According to the method, at step 910, a browser accesses a web page. For example, the web page shown in FIG. 4 is accessed by a visually impaired or blind user by input the web address on the browser. The web page comprises a plurality of user interface elements. At this time, the content of the web page, such as HTML, XML of the web page can be obtained by the browser.

At step 920, the browser obtains information comprising respective identifications of the plurality of user interface elements and respective hot keys corresponding to respective user interface elements. As shown in FIG. 4, IDs of the ten user interface elements and their corresponding hot keys can be obtained by the browser 504.

At step 930, the browser sends the information to an assistive tool for being read out so that a visually impaired or blind user can hear, and then make a further action, such as press a hot key.

At step 940, if a hot key corresponding to a user interface element is input by the visually impaired or blind user, the browser executes an action corresponding to the user interface element.

In some embodiments, the web browser implementing the flow chart 900 may obtain respective IDs of the plurality of user interface elements from web contents of the web page, then assign respective hot keys to respective user interface elements, and then generate the information comprising respective identifications (IDs) of the plurality of user interface elements and respective hot keys corresponding to respective user interface elements.

In some embodiments, the web browser implementing the flow chart 900 may obtain respective descriptions for respective user interface elements and add the respective descriptions to the information.

In some embodiments, the web browser implementing the flow chart 900, when executing an action corresponding to the user interface element, may obtain a mouse action to be executed responsive to the user interface element corresponding to the hot key being activated, and then execute the mouse action. Or the web browser implementing the flow chart 900, when executing an action corresponding to the user interface element, may obtain a multiple tab hits action to be executed responsive to the user interface element corresponding to the hot key being activated and then execute the multiple tab hits action.

In some embodiments, the browser may monitor the actions taken by a web client for the web page, and when the browser sends the information to an assistive tool, if a specific user interface element on the web page is monitored to be accessed frequently in the actions taken by the web client for the web page, the browser may reorganize the information in which the specific user interface element and a hot key corresponding to the specific user interface element are at the beginning of the information and then send the reorganized information to the assistive tool.

In some embodiments, the web browser implementing the flow chart 900 may obtain a tree structure of user interface elements for the web page, wherein a root node of the tree structure represents the web page and each child node of the tree structure represents a user interface element that functions on the web page and then send the tree structure to the assistive tool so that the assistive tool can read the tree structure.

In some embodiments, the web browser implementing the flow chart 900 may obtain a tree structure of user interface elements for a plurality of related web pages in response to the plurality of related web pages being accessed, and then send the tree structure of user interface elements for the plurality of related web pages to the assistive tool for being read out.

It should be noted that the method or the system for accessing web contents interactively according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    accessing, by one or more processors, a web page comprising a plurality of user interface elements, wherein each user interface element in the plurality of user interface elements includes an action corresponding to the user interface element, wherein the action is to be performed by the web page;
    obtaining, by the one or more processors, text information from the web page, wherein the text information includes an identification for each of the plurality of user interface elements and a hot key corresponding to each user interface element in the plurality of user interface elements;
    sending, by the one or more processors, the text information to an assistive tool, wherein the assistive tool transmits the text information to a visually impaired user using a text-to-speech algorithm; and
    executing, by the one or more processors, the action corresponding to the user interface element when the visually impaired user selects the hot key corresponding to the user interface element.

2. The method of claim 1, wherein the obtaining, by the one or more processors, the text information further comprises:
    obtaining, by the one or more processors, an identification for each of the plurality of user interface elements from the web page; and
    assigning, by the one or more processors, a hot key to each of the plurality of user interface elements.

3. The method of claim 1, further comprising:
    obtaining, by the one or more processors, a description for each of the plurality of user interface elements; and
    adding, by the one or more processors, the description to the text information.

4. The method of claim 1, wherein the executing, by the one or more processors, the action corresponding to the user interface element comprises:
    obtaining, by the one or more processors, a mouse action to be executed by the web page corresponding to the user interface element, wherein the mouse action corresponds to the hot key selected by the visually impaired user; and
    executing, by the one or more processors, the mouse action.

5. The method of claim 1, wherein the executing, by the one or more processors, the action corresponding to the user interface element comprises:

obtaining, by the one or more processors, a multiple-tab-hits action to be executed by the web page corresponding to the user interface element, wherein the multiple-tab-hits action corresponds to the hot key selected by the visually impaired user; and executing, by the one or more processors, the multiple-tab-hits action.

6. The method of claim 1, wherein a frequency of accessing each of the plurality of user interface elements on the web page is monitored, and wherein the sending the text information to the assistive tool further comprises:

modifying, by the one or more processors, the text information by reorganizing the identification of a specific user interface element and the hot key corresponding to the specific user interface element when the specific user interface element is accessed frequently on the web page; and sending, by the one or more processors, modified text information to the assistive tool.

7. The method of claim 1, further comprising:

obtaining, by the one or more processors, a tree structure of user interface elements for the web page, wherein a root node of the tree structure represents the web page and each child node of the tree structure represents a user interface element that functions on the web page; and sending, by the one or more processors, the tree structure to the assistive tool.

8. The method of claim 1, further comprising:

obtaining, by the one or more processors, a tree structure of user interface elements for a plurality of related web pages when the plurality of related web pages is accessed, and sending, by the one or more processors, the tree structure of user interface elements for the plurality of related web pages to the assistive tool.

9. A computer system comprising:

one or more processors, a memory coupled to at least one of the processors and a set of computer program instructions stored in memory and executed by at least one of the processors in order to perform actions of:

accessing a web page comprising a plurality of user interface elements, wherein each user interface element in the plurality of user interface elements includes an action corresponding to the user interface element, wherein the action is to be performed by the web page;

obtaining text information from the web page, wherein the text information includes an identification for each of the plurality of user interface elements and a hot key corresponding to each user interface element in the plurality of user interface elements;

sending the text information to an assistive tool, wherein the assistive tool transmits the text information to a visually impaired user using a text-to-speech algorithm; and executing the action corresponding to the user interface element when the visually impaired user selects the hot key corresponding to the user interface element.

10. The computer system of claim 9, wherein the obtaining the text information further comprises:

obtaining an identification for each of the plurality of user interface elements from the web page; and assigning a hot key to each of the plurality of user interface elements.

11. The computer system of claim 9, further comprising:

obtaining a description for each of the plurality of user interface elements; and adding the description to the text information.

12. The computer system of claim 9, wherein the executing the action corresponding to the user interface element comprises:

obtaining a mouse action to be executed by the web page corresponding to the user interface element, wherein the mouse action corresponds to the hot key selected by the visually impaired user; and executing the mouse action.

13. The computer system of claim 9, wherein the executing the action corresponding to the user interface element comprises:

obtaining a multiple-tab-hits action to be executed by the web page corresponding to the user interface element, wherein the multiple-tab-hits action corresponds to the hot key selected by the visually impaired user; and executing the multiple-tab-hits action.

14. The computer system of claim 9, wherein a frequency of accessing each of the plurality of user interface elements on the web page is monitored, and wherein sending the information to the assistive tool further comprises:

modifying the text information by reorganizing the identification of a specific user interface element and the hot key corresponding to the specific user interface element when the specific user interface element is accessed frequently on the web page; and sending modified text information to the assistive tool.

15. A computer program product, comprising a computer readable storage medium having program instructions stored thereon, the program instructions executable by one or more processors in a load balancer cluster which comprises a plurality of load balancers and an assistant, to cause the one or more processors to perform a method of:

accessing a web page comprising a plurality of user interface elements, wherein each user interface element in the plurality of user interface elements includes an action corresponding to the user interface element, wherein the action is to be performed by the web page;

obtaining text information from the web page, wherein the text information includes an identification for each of the plurality of user interface elements and a hot key corresponding to each user interface element in the plurality of user interface elements;

sending the text information to an assistive tool, wherein the assistive tool transmits the text information to a visually impaired user using a text-to-speech algorithm; and executing the action corresponding to the user interface element when the visually impaired user selects the hot key corresponding to the user interface element.

16. The computer program product of claim 15, wherein the obtaining the text information further comprises:

obtaining an identification for each of the plurality of user interface elements from the web page; and assigning a hot key to each of the plurality of user interface elements.

17. The computer program product of claim 15, further comprising:

obtaining a description for each of the plurality of user interface elements; and adding the description to the text information.

18. The computer program product of claim 15, wherein the executing the action corresponding to the user interface element comprises:

obtaining a mouse action to be executed by the web page corresponding to the user interface element, wherein the mouse action corresponds to the hot key selected by the visually impaired user; and executing the mouse action.

19. The computer program product of claim 15, wherein the executing the action corresponding to the user interface element comprises:

obtaining a multiple-tab-hits action to be executed by the web page corresponding to the user interface element, wherein the multiple-tab-hits action corresponds to the hot key selected by the visually impaired user; and executing the multiple-tab-hits action.

20. The computer program product of claim 15, wherein a frequency of accessing each of the plurality of user interface elements on the web page is monitored, and wherein sending the information to the assistive tool further comprises:

modifying the text information by reorganizing the identification of a specific user interface element and the hot key corresponding to the specific user interface element when the specific user interface element is accessed frequently on the web page; and sending modified text information to the assistive tool.

* * * * *